(12) United States Patent
Matsumoto

(10) Patent No.: US 6,842,408 B1
(45) Date of Patent: Jan. 11, 2005

(54) OPTICAL DISK APPARATUS, FOCUS-VALUE CORRECTING METHOD, AND OPTICAL DISK

(75) Inventor: Yoshinori Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 735 days.

(21) Appl. No.: 09/652,404

(22) Filed: Aug. 31, 2000

(30) Foreign Application Priority Data

Sep. 16, 1999 (JP) .......................................... P11-262684

(51) Int. Cl.[7] .............................................. G11B 07/00
(52) U.S. Cl. ............................... 369/44.27; 369/53.37; 369/275.3
(58) Field of Search .......................... 369/44.27, 44.29, 369/44.35, 44.26, 53.28, 53.37, 275.3, 44.11, 44.14, 44.17, 44.25, 44.31, 44.34, 53.22, 53.23, 53.41

(56) References Cited

U.S. PATENT DOCUMENTS

| | | | | |
|---|---|---|---|---|
| 4,482,987 A | * | 11/1984 | Okada et al. ................. | 386/126 |
| 5,142,520 A | * | 8/1992 | Yanagi et al. ............. | 369/44.29 |
| 5,177,726 A | * | 1/1993 | Terada ...................... | 369/44.27 |
| 5,270,991 A | * | 12/1993 | Verboom ................... | 369/44.26 |
| 5,282,184 A | * | 1/1994 | Takikita .................... | 369/44.25 |
| 5,388,090 A | * | 2/1995 | Hoshino et al. .......... | 369/44.34 |
| 5,574,706 A | | 11/1996 | Verboom et al. | |
| 5,699,330 A | * | 12/1997 | Ogino et al. .............. | 369/44.27 |
| 5,828,636 A | | 10/1998 | Matsumoto et al. | |
| 5,894,463 A | * | 4/1999 | Okawa et al. ............ | 369/44.35 |

FOREIGN PATENT DOCUMENTS

| | | | | |
|---|---|---|---|---|
| EP | 0 392 561 | | 10/1990 | |
| JP | 11053736 A | * | 2/1999 | ............ G11B/7/00 |
| WO | WO 99/17283 | | 4/1999 | |

\* cited by examiner

Primary Examiner—Thang V. Tran
Assistant Examiner—Bach Vuong
(74) Attorney, Agent, or Firm—Oblon, Spivak, McClelland, Maier & Neustadt, P.C.

(57) ABSTRACT

An optical head 2 and a matrix circuit 3 cooperate, generating a signal form the light reflected from an optical disk 1. An evaluation-function generating circuit 5 generates an evaluation function from the signal reproduced from the optical disk 1. A controller 6 sets an initial focus value at a point where the evaluation function is minimal. The initial focus value is set in a servo circuit 7. The controller 6 sets an observation point deviating from the point at which it has set the initial focus value. The controller 6 corrects the initial focus value set in the servo circuit 7.

11 Claims, 7 Drawing Sheets

OPTICAL DISK APPARATUS, FOCUS-VALUE CORRECTING METHOD, AND OPTICAL DISK

BACKGROUND OF THE INVENTION

The present invention relates to an optical disk apparatus for recording and reproducing data on and from an optical disk. More particularly, the invention relates to an optical disk apparatus which can correct a focus value accurately within a short time and which can thus have good recording/reproducing characteristic. The invention also relates to a focus-value correcting method that can correct a focus value accurately within a short time. The invention further relates to an optical disk.

In the field of optical disk apparatuses for recording and reproducing data on and from optical disks, compact disks (CDs) having audio signals recorded on them have already been in use in large numbers. Recently, digital versatile disks (DVDs), which have a large storage capacity and from which data can be transferred at high rate, have come into use as media for recording motion pictures. In addition, MO (Magneto-Optical) disks, PDs (Phase-Change Disks) and DVD-RAMs have been put to practical use as recording/reproducing disks.

Thanks to the advanced microprocessor technology and the like, not only text data, but also audio data, still-picture data, motion-picture data and the like can be recorded on and reproduced from the above-mentioned various kinds of disks. It is therefore increasingly demanded that disk systems be developed which have a storage capacity large enough to store these various items of data and which can change the rate of transferring the data.

To increase the data storage capacity of the optical disk system, it is generally necessary to reduce the size of the beam spot in the operation of recording and reproducing data on and from the disk, thereby to record data at high density on the optical disk. The size a of a beam spot is given as follows:

$$a = \alpha \times \lambda / NA$$

where $\alpha$ is the constant determined by the distribution of light bean intensity, $\lambda$ is the wavelength of the light beam, and NA is the numerical aperture of the objective lens provided in the optical disk system.

Thus, a small beam spot can be formed on the surface of the optical disk if the optical disk system has a semiconductor laser for emitting a beam of short wavelength and an objective lens having a large NA value. If so, the system can record data at high density on the optical disk and can thereby have a large storage capacity.

If the beam spot is made small by this method, however, the focal depth will decrease. In other words, the tolerance for defocusing (i.e., focusing error) will inevitably decrease. The focal depth d is usually expressed as follows:

$$d \propto \lambda / (NA)^2.$$

That is, the shorter the wavelength of the light beam and the larger the NA, the more the focal depth will decrease. In the optical disk apparatus for recording and reproducing data on and from an optical disk at high density, high-precision focusing control should, therefore, be performed to place the recording surface of the disk within the focal depth of the objective lens.

The defocusing occurs in the focusing control, due to various causes. It may result from the steady-state deviation that has not been eliminated completely during the servo control. It may result from the difference between optical disks in terms of substrate thickness. It may be caused by the changes in the servo target value, due to the offset changes that occur as the temperature rises in the optical disk apparatus.

Of these causes of defocusing, the steady-state deviation is determined by the size and gain of the focus-disturbing element. In most cases of high-density, data-recording/reproducing, the disturbance (e.g., warping of the disk) are reduced and the gain of the focus-disturbing element are increased, thereby minimizing the steady-state deviation. To reduce the defocusing resulting from the difference between optical disks in substrate thickness, thereby to raise the focusing precision, the focus may be automatically adjusted in accordance with the jitter value or the like of the ROM section. In this case, it suffices to change the focus bias to various values and select the most desirable one in accordance with the jitter value detected at the time of inserting the disk is inserted into the optical disk apparatus.

While the optical disk apparatus is operating, it is difficult to eliminate the offset change or the like resulting from the temperature rise in the optical disk apparatus. To eliminate the offset change or the like during the operation of the optical disk apparatus, the change of the offset must be detected at short intervals by simple means, thereby to move the focus to an optimal point. In practice, however, the change of the offset can hardly be detected at short intervals by simple means during the operation of the optical disk apparatus.

BRIEF SUMMARY OF THE INVENTION

The present invention has been made in view of the foregoing. The first object of the invention is to provide an optical disk apparatus which can correct a focus value accurately within a short time and which can thus have good recording/reproducing characteristic. The second object of this invention is to provide a focus-value correcting method that can be used in an optical disk apparatus to correct a focus value. The third object of the invention is to provide an optical disk with which the method can be employed to correct a focus value.

To attain the first object, an optical disk apparatus according to the present invention is designed to record and reproduce data on and from an optical disk having a signal-recording surface. The apparatus comprises: optical head means for applying a light spot to the signal-recording surface of the optical disk; focusing control means for controlling the focusing operation the optical head means performs to place the signal-recording surface of the optical disk within a focal distance of the light spot applied by the optical head means; evaluation-function generating means for generating an evaluation function for correcting a focus value set in the focusing control means, in accordance with signals the optical head means has generated from light reflected from the optical disk; and control means for setting an initial focus value at a point where the evaluation function generated by the evaluation-function generating means is minimal or maximal, for setting an observation point deviating from the point where the initial focus value is set, and for correcting the initial focus value in accordance with changes in the evaluation function at the observation point.

To achieve the second object, a focus-value correcting method according to the invention is designed for use in focusing control for placing the signal-recording surface of an optical disk within the focal depth of a light pot an optical head has applied to the optical disk. The method comprises the steps of: setting an initial focus value at a point where an evaluation function for correcting a focus value set in the focusing control means is minimal or maximal, said evaluation function having been generated from signals the optical head means has generated from light reflected from the optical disk; setting an observation point deviating from the point where the initial focus value is set, and acquiring the first evaluation function at the observation point thus set; determining the timing at which to correct the focus value to perform the focusing control; acquiring the second evaluation function at the observation point at the timing determined; and correcting the initial focus value in accordance with a difference between the first evaluation function and the second evaluation function.

To accomplish the third object, an optical disk according to this invention has a signal-recording surface that is placed within a focal depth of a light spot applied on the signal-recording surface by an optical head, during focusing control. The disk further has: a servo region on the signal-recording surface; and an evaluation-function recording area provided at a prescribed part of the servo region, for recording evaluation functions that are applied to correct a focus value for use in the focusing control.

As described above, the observation point, at which to correct the focal value to achieve reliable focusing control, is deviated from an optimal point, whereby the focal value is corrected accurately within a short time. The optical disk apparatus of the invention can therefore have good recording/reproducing characteristic.

DETAILED DESCRIPTION OF THE INVENTION

Figure 1:
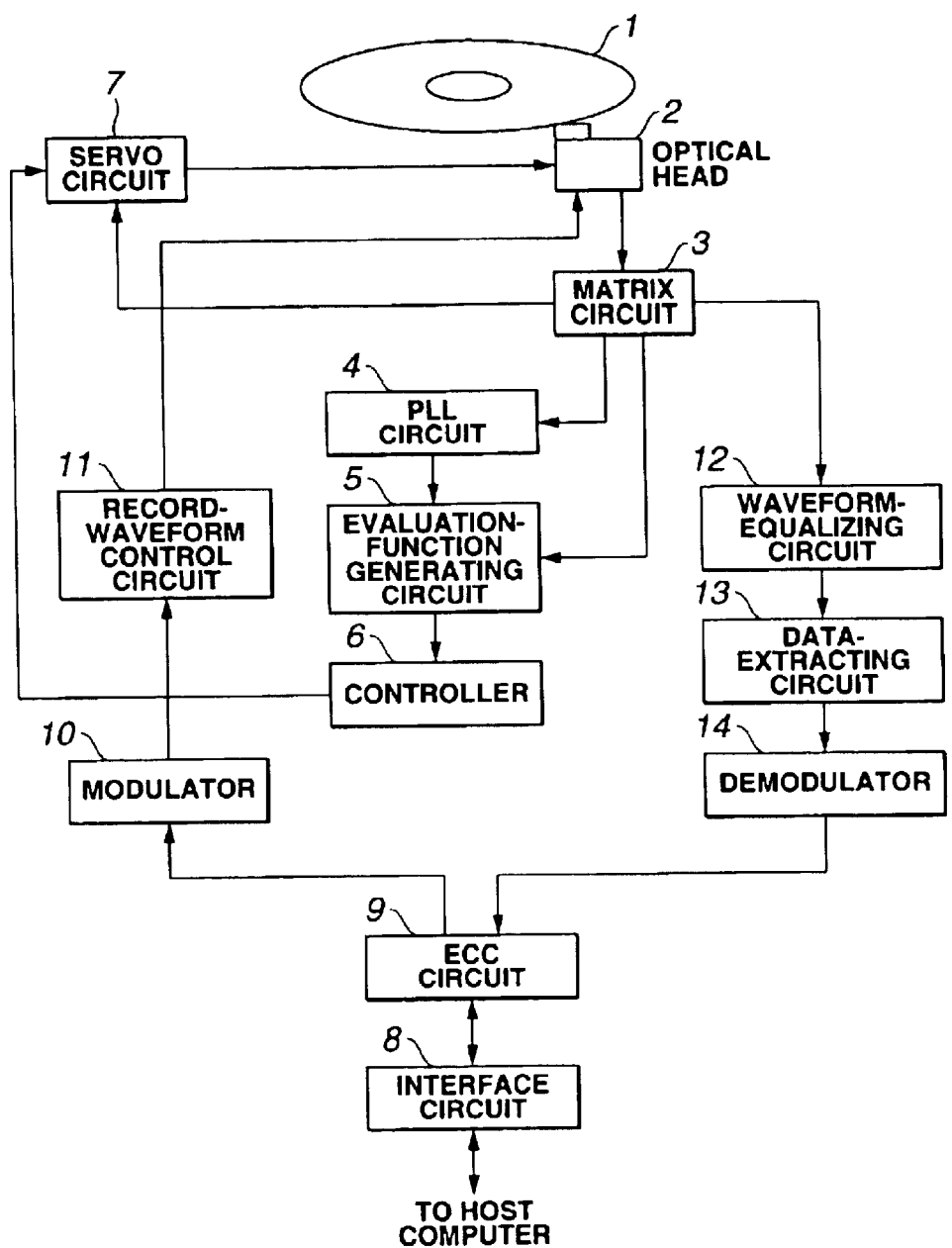
FIG. 1 is a block diagram of an optical disk apparatus according to this invention.

An embodiment of the present invention will be described, with reference to the accompanying drawings. The embodiment is an optical disk apparatus that has an optical head 2 as shown in FIG. 1. The apparatus is designed to record and reproduce data on and from the signal-recording surface of an optical disk 1.

The optical disk apparatus comprises, in addition to the optical head 2, a matrix circuit 3, a PLL circuit 4, an evaluation-function generating circuit 5, a controller 6, and a servo circuit 7. The matrix circuit 3 generates various error signals and the like from the output of the optical head 2. The PLL circuit 4 generates a system clock signal from the RF reproduced signal generated by the matrix circuit 3. The system clock signal is supplied to the evaluation-function generating circuit 5. The evaluation-function generating circuit 5 generates an evaluation function (later described) from the jitter the PLL circuit 4 has generated. The controller 6 controls the servo circuit 7 in accordance with the evaluation function generated by the evaluation-function generating circuit 5. The servo circuit 7 performs focusing control as will be described later in detail, under the control of the controller 6.

The optical disk apparatus further comprises an interface circuit 8, an ECC circuit 9, a modulator 10, and a record-waveform control circuit 11. The interface circuit 8 connects the ECC circuit 9 to an external host computer (not shown). The ECC circuit 9 receives a commands and data from the external host computer via the interface circuit 8 and adds data-correcting codes to the data. The modulator 10 modulates the output of the ECC circuit 9. The record-waveform control circuit 11 converts the data output from the modulator 10 to a record signal of an appropriate magnitude. The record signal is supplied to the optical head 2, which records marks on the optical disk 1 in accordance with the waveform of the record signal.

The optical disk apparatus further comprises a waveform-equalizing circuit 12, a data-extracting circuit 13, and a demodulator 14. The waveform-equalizing circuit 12 equalizes the waveform of the RF signal supplied from the matrix circuit 3. The data-extracting circuit 13 extracts binary data from the output of the waveform-equalizing circuit 12. The demodulator 14 demodulates the binary data output from the data-extracting circuit 13.

To record data on the optical disk 1, the ECC circuit 9 receives commands and data from the external host computer through the interface circuit 8 and adds data-correcting codes to the data. The output of the ECC circuit 9 is supplied to the modulator 10. The modulator 10 modulates the data output from the ECC circuit 9. The data modulated is supplied to the control circuit 11, which converts the data to a record signal of an appropriate magnitude. The record signal is supplied to the optical head 2. The head 2 generates a laser beam having intensity that corresponds to the waveform of the record signal. The optical head 2 applies a laser beam is applied to the optical disk 1, whereby the data is recorded on the optical disk 1.

To reproduce the data from the optical disk 1, the waveform-equalizing circuit 12 equalizes the waveform of the RF signal supplied from the matrix circuit 3. The data-extracting circuit 13 extracts binary data from the output of the waveform-equalizing circuit 12. The demodulator 14 demodulates the binary data output from the data-extracting circuit 13. The ECC circuit 9 corrects reading errors, if any, resulting from the defects made in the recording surface of the disk 1. The binary data, thus corrected, is supplied to the external host computer through the interface circuit 8.

The servo circuit 7 receives various error signals from the matrix circuit 3. In accordance with the error signals, the servo circuit 7 performs focusing control, tracking control, thread control and the like, thereby accurately positioning the beam spot on the optical disk 1, said beam spot pertaining to the laser beam the optical head 2 is applying to the optical disk 1. The present invention is applied to the focusing control, in which the signal-recording surface of the optical disk 1 is placed within the focal depth of the objective lens incorporated in the head 2. The focusing control achieved by the servo circuit 7 is affected by the changes in the offset, which have resulted from a temperature rise and the like in the optical disk apparatus.

The initial focus value set in the servo circuit 7 is therefore corrected in the optical disk apparatus, as will be described below.

First, the evaluation-function generating circuit 5 generates an evaluation function from the signal the matrix circuit 3 has generated from the light beam reflected from the optical disk 1 and detected by the optical head 2. More precisely, the circuit 5 generates the evaluation function from the jitter which the PLL circuit 4 generates when it generates the system clock signal from the RF signal supplied from the matrix circuit 3. The evaluation function, thus generated, will be used in the focusing control. The evaluation-function generating circuit 5 may generate the evaluation function from the amplitude of the RF signal, not from the jitter the PLL circuit 4 generates. The evaluation function thus generated is read by the controller 6.

The controller 6 corrects the focus value by performing the focus-value correcting method according to this invention. In the method (later described in detail), an initial focus value is set at a point where the evaluation function is minimal, and an observation point is set, which is deviated from the point where the initial focus value is set. The controller 6 corrects the initial focus value, thus set in the servo circuit 7, in accordance the change in the evaluation function at the observation point.

Figure 2:
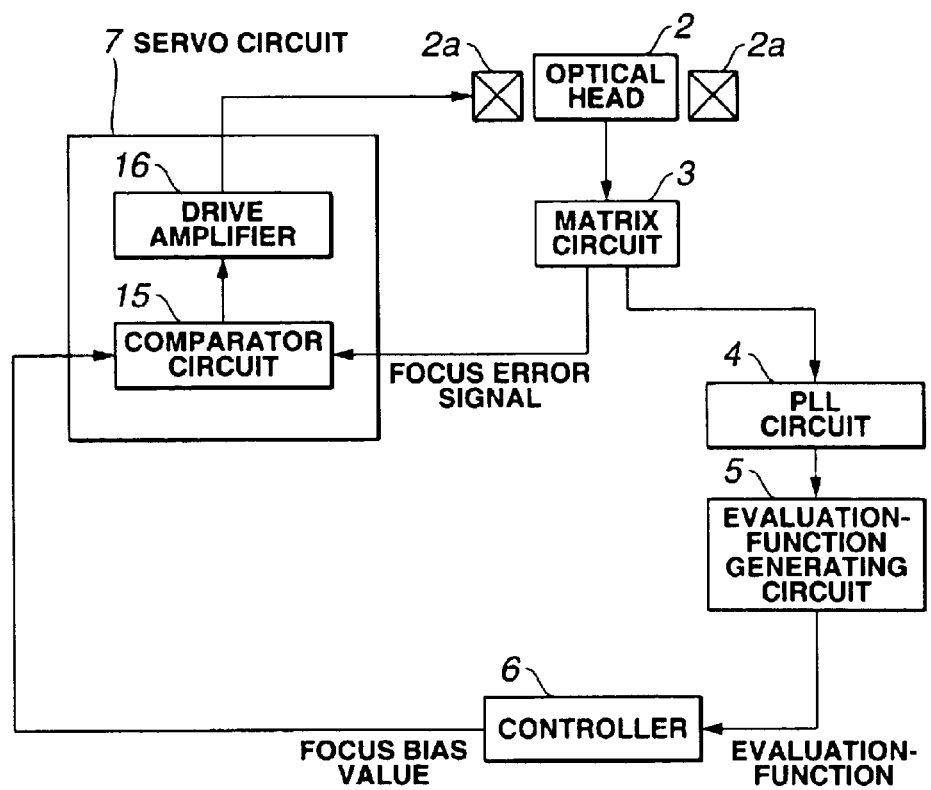
FIG. 2 is a block diagram showing the major components of the optical disk apparatus.

The servo circuit 7 uses the focus value corrected by the controller 6, thereby accomplishing focusing control. FIG. 2 shows the servo circuit 7 and the components peripheral to the circuit 7. As shown in FIG. 2, the focus value, thus corrected, is supplied from the controller 6 to the comparator circuit 15 provided in the servo circuit 7. A focus error signal is supplied from the matrix circuit 3 to the comparator circuit 15. The comparator circuit 15 compares the focus error signal with the focus value, finding the difference between the focus error and the focus value. The comparator circuit 15 supplies a drive signal to a coil 2a through a drive amplifier 16, until the difference between the focus error and the focus value decreases to nil. Focusing control is thereby performed on the optical head 2.

Figure 3:
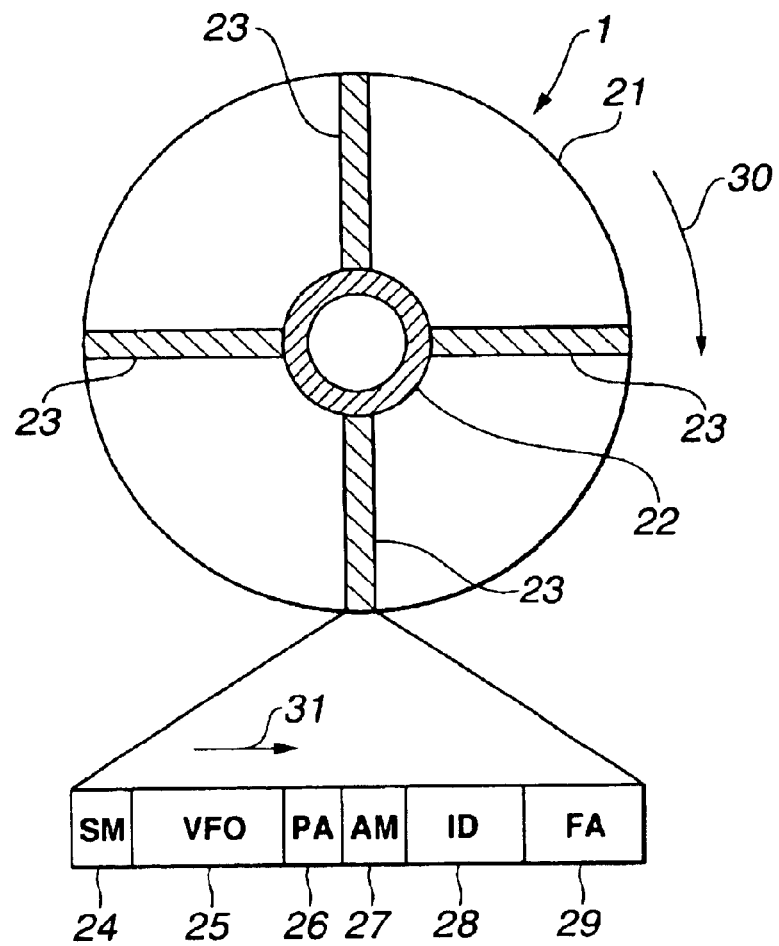
FIG. 3 is a diagram illustrating an optical disk on and from which the optical disk apparatus records and reproduce data.

The optical disk 1 will be described with reference to FIG. 3. As FIG. 3 shows, the optical disk 1 has a recording region 21, a ROM region 22, and four pit regions 23 on its recording surface. Each pit region 23 consists of a sector mark (SM) region 24, a VFO area 25, a preamble (PA) area 26, an address mark (AM) area 27, an address ID data (ID) area 28, and a focus adjustment (FA) area 29. A sector mark is recorded in the SM area 24 to achieve ordinary pit addressing. The VFO area 25 is provided to accomplish PLL data extraction. The address data designating the positions of tracks and the random data for use in focus adjustment are recorded on the optical disk 1. Nonetheless, the random data may not be recorded and the address data may be used to achieve focus adjustment, as well. The ROM region 22 and the pit regions 23 are optically equivalent in terms of linear density, track pitch and the like. As the optical disk 1 is rotated in the direction of arrow 30, the beam spot that the laser beam emitted from the head 2 forms on the optical disk 1 moves on each pit region 23 in the direction of arrow 31.

Track numbers are sparsely described in the SM area 24 in the form of patterns that can be easily read. The VFO region 25 is provided to achieve PLL operation to prevent a synchronization in the ID area 28. The PA area 26 is a so-called "guard area". The AM area 27 has been subjected to PLL operation, indicating that the ID area 28 will follow next. The ID area 28 is necessary to record the track number, sector number and other data in one track.

The FA area 29 is provided to set a focus value for performing focusing control in the optical disk apparatus. In the FA area 29 there is described, for example, a random carrier pattern. The evaluation-function generating circuit 5 uses the random carrier pattern to measure the jitter the PLL circuit 4 has generated. At the end of the ID area 28, the focus-changing operation starts, measuring the jitter by using the random carrier pattern.

As shown in FIG. 3, the four pit regions 23 are arranged, forming a cross. Hence, the optical disk apparatus carries out focusing control four times, every time the optical disk 1 is rotated once.

Figure 4:
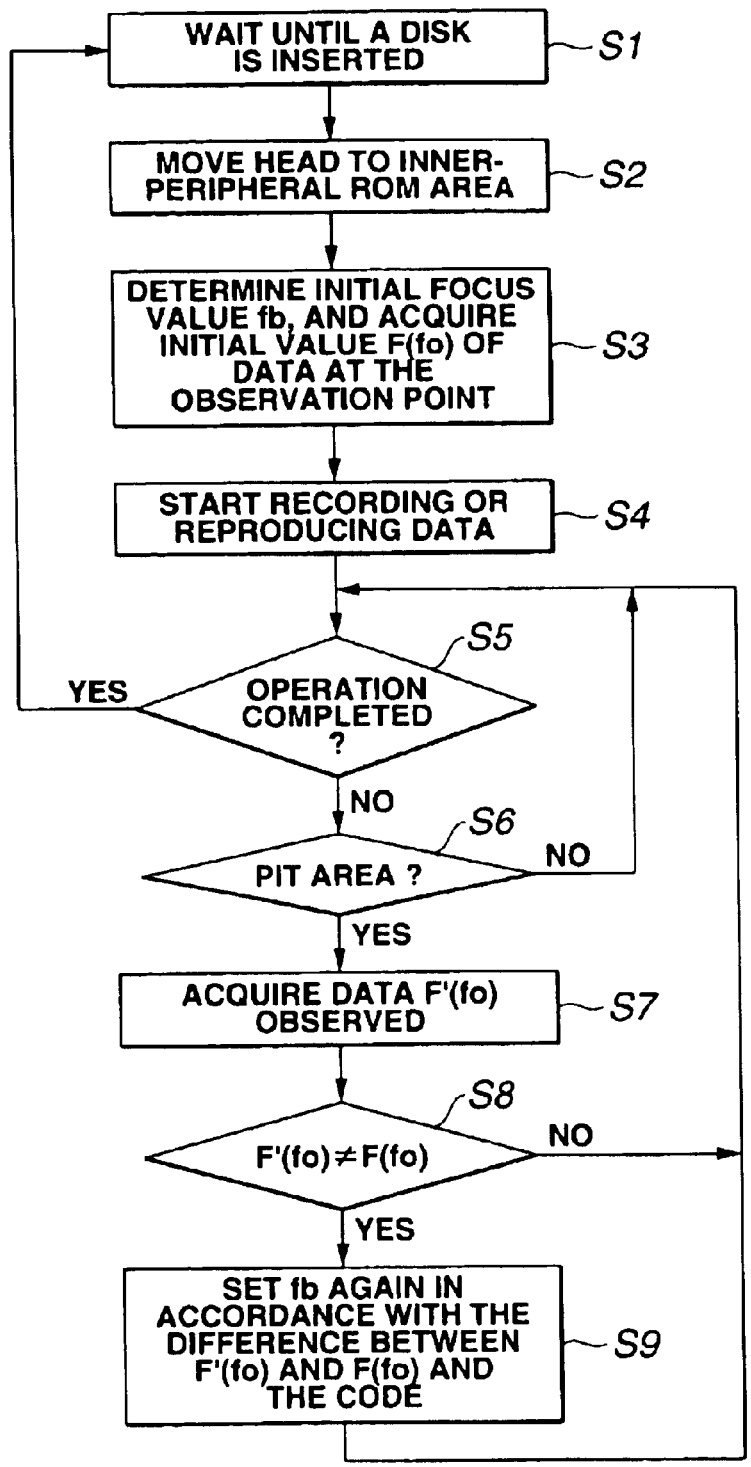
FIG. 4 is a flowchart explaining the operation of the optical disk apparatus.

How the optical disk apparatus performs the focusing control with respect to the optical disk 1 will be explained, with reference to the flowchart of FIG. 4. The flow chart shows the sequence of correcting the focus value set, or the focus-value correcting method according to the present invention. It is the controller 6 that effects the focus-value correcting method.

In Step S1, the optical disk 1 is inserted into the optical disk apparatus. In Step S2, the optical head 2 is moved to the ROM region 22, i.e., the innermost circular track of the disk 1. Hill-climbing method, for example, is performed, thus correcting the focus value so that the evaluation function may become minimal.

Figure 5:
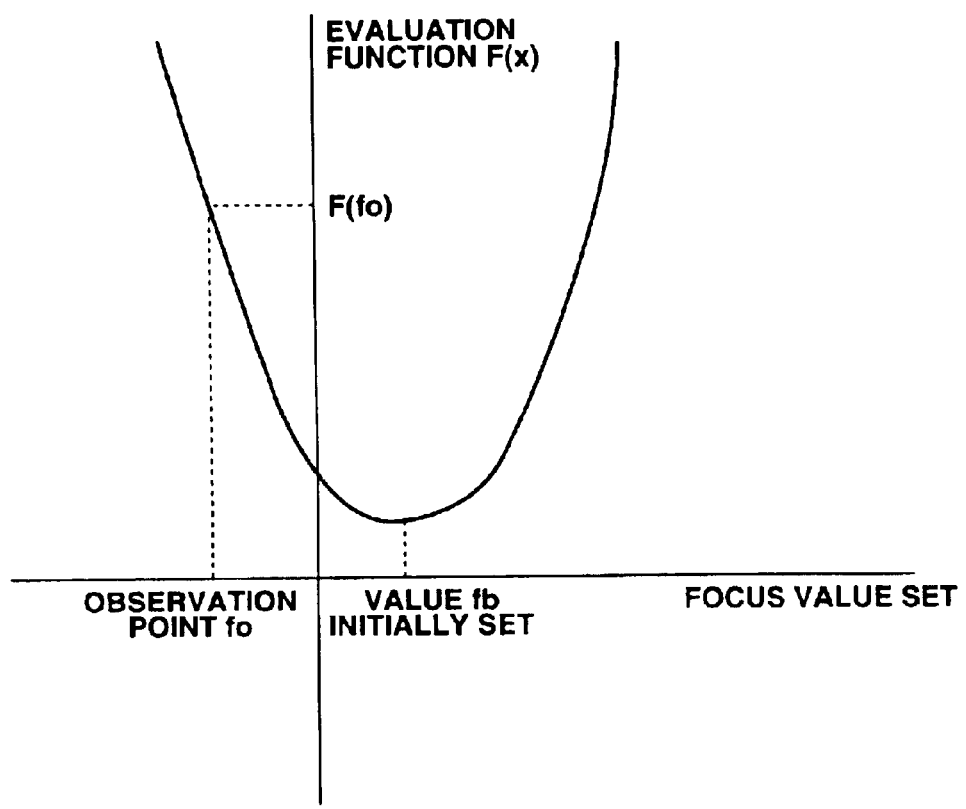
FIG. 5 is an evaluation-function characteristic diagram for explaining the relation between a focus value set and an observation point.
Figure 6:
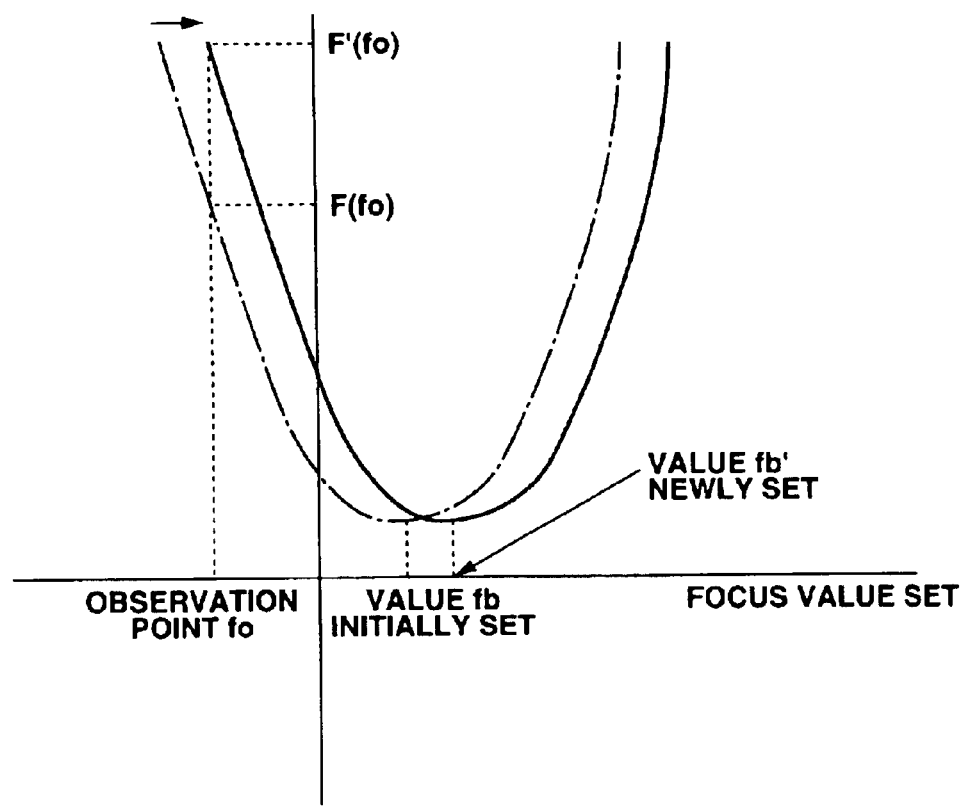
FIG. 6 is an evaluation-function characteristic diagram explaining how the optimal focus point and the observation point move when the temperature rises.

As described above, the evaluation function is generated from the jitter the PLL circuit 4 has generated. Instead, the function may be one which changes like a quadratic function, with the degree of defocusing represented by the amplitude of the smallest mark and which is sufficiently sensitive to the defocusing. In Step S3, an initial focus value fb is set. At the same time, an observation point f0 is set as is illustrated in FIG. 5. Preferably, the observation point f0 is one before and after which the servo system operates reliably and which deviates as much as possible from the initial focus value fb. A focus value is set at the observation point f0, thereby acquiring an evaluation function F(f0) at the observation point f0. The evaluation function F(f0) is stored into a memory or the like.

Thereafter, the initial focus value fb is applied. In Step S4, the optical disk apparatus records data on the optical disk 1 or reproduces data from the optical disk 1. In Step S5 it is determined whether the data has been recorded or reproduced completely. If it is determined that the data has not been completely recorded or reproduced, the focus value is temporarily shifted to the observation point f0 in the focus adjustment (FA) area 29 of each pit region 23 that periodically appears because it is provided on the rotating optical disk 1. Then, an evaluation function F f0) is acquired at this time. This evaluation function F f0) may be greater than the evaluation function F(f0) previously acquired, that is:

$$F'f0)>F(f0)$$

In this case, the evaluation function F'(f0) indicates that the focus value contains an offset or the like that has resulting from, for example, the temperature rise and the like in the optical disk apparatus. In other words, the evaluation function has undergone an apparent change. Thus, the initial focus value fb is changed to a focus value f'b, whereby the focus value is set at the optimal point again. At this time, the observation point f0 is set anew to f'0, which is defined as follows:

$$f'0=f0+(f'b-fb)$$

The evaluation function F'(f0) may be smaller than the evaluation function F(f0) previously acquired, that is:

$$F'(f0) < F(f0)$$

Figure 7:
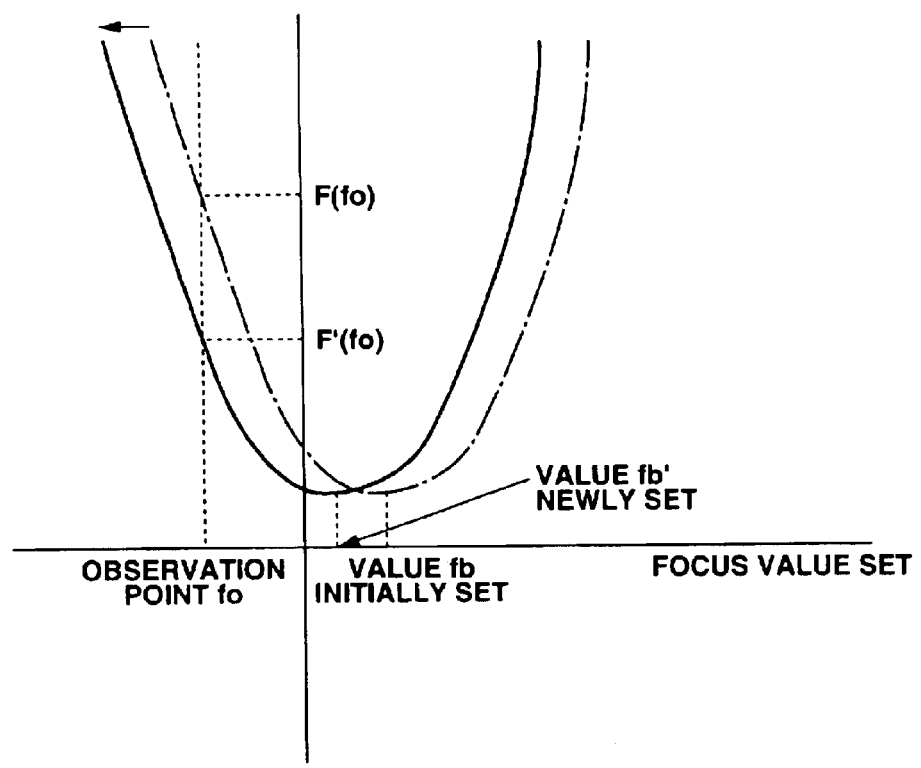
FIG. 7 is an evaluation-function characteristic diagram explaining how the optimal focus point and the observation point move when the temperature falls.

If this is the case, the evaluation function F'(f0) indicates that the temperature in the optical disk apparatus has fallen. Thus, the initial focus value fb is changed to a focus value f'b as shown in FIG. 7, in accordance with the absolute value of the difference between the function F'(f0) and the function F(f0).

As has been described, the focus-value correcting method according to the invention can correct the change in a servo target value, due to the offset contained in the focus value, in both magnitude and direction, by measuring the evaluation function at one observation point only. Since the evaluation function is minimal at the observation point, the focus value can be corrected, even while the head 2 is recording data on the disk 1 or reproducing data from the disk 1, since the optical disk 1 has pit regions 23. Thus, the defocusing can be reliably minimized during the data-recording operation and data-reproducing operation. This enables the optical disk apparatus to record and reproduce data on and from the optical disk 1 at high density.

The focus value for focusing control may be corrected every time the optical disk 1 is rotated a prescribed number of times. Alternatively, the focus value may be corrected whenever the temperature in the optical disk apparatus changes by a predetermined value. Still alternatively, the focus value may be corrected at regular time intervals. The CPU 6 determines the timing of correcting the focus value from the number of times the optical disk 1 has been rotated, from the changes of temperature in the optical disk apparatus, or from the time that has elapsed.

What is claimed is:

1. An optical disk apparatus for recording and reproducing data on and from an optical disk having a signal-recording surface, said apparatus comprising:

optical head means for applying a light spot to the signal-recording surface of the optical disk;

focusing control means for controlling the focusing operation the optical head means performs to place the signal-recording surface of the optical disk within a focal distance of the light spot applied by the optical head means;

evaluation-function generating means for generating an evaluation function for correcting a focus value set in the focusing control means, in accordance with signals the optical head means has generated from light reflected from the optical disk; and control means for setting an initial focus value at a point where the evaluation function generated by the evaluation-function generating means is minimal or maximal, for setting an observation point deviating from the point where the initial focus value is set, and for correcting the initial focus value in accordance with changes in the evaluation function at the observation point.

2. The optical disk apparatus according to claim 1, wherein the evaluation-function generating means generates an evaluation function that changes like a quadratic function with a degree of defocusing, and the control means sets the initial focus value at the point where the evaluation function is minimal.

3. The optical disk apparatus according to claim 2, wherein the control means increases the initial focus value in direct proportion to the evaluation function at the observation point.

4. The optical disk apparatus according to claim 2, wherein the control means decreases the initial focus value in direct proportion to the evaluation function at the observation point.

5. The optical disk apparatus according to claim 1, wherein the control means corrects the focus value set in the focusing control means, every time the optical disk rotates a prescribed number of times.

6. The optical disk apparatus according to claim 1, wherein the control means corrects the focus value set in the focusing control means, every time the temperature in the apparatus changes by a prescribed value.

7. The optical disk apparatus according to claim 1, wherein the control means corrects the focus value set in the focusing control means, at regular time intervals.

8. The optical disk apparatus according to claim 1, wherein the control means corrects the focus value set in the focusing control means, in accordance with the light reflected from the optical disk.

9. A focus-value correcting method for use in focusing control for placing the signal-recording surface of an optical disk within the focal depth of a light pot an optical head has applied to the optical disk, said method comprising the steps of:

setting an initial focus value at a point where an evaluation function for correcting a focus value set in the focusing control means is minimal or maximal, said evaluation function having been generated from signals the optical head means has generated from light reflected from the optical disk;

setting an observation point deviating from the point where the initial focus value is set, and acquiring the first evaluation function at the observation point thus set;

determining the timing at which to correct the focus value to perform the focusing control;

acquiring the second evaluation function at the observation point at the timing determined; and correcting the initial focus value in accordance with a difference between the first evaluation function and the second evaluation function.

10. An optical disk having a signal-recording surface that is placed within a focal depth of a light spot applied on the signal-recording surface by an optical head, during focusing control, said disk having:

a servo region on the signal-recording surface; and an evaluation-function recording area provided at a prescribed part of the servo region, for recording values of an evaluation function that are applied to correct a focus value for use in the focusing control, an initial focus value being recorded at a point where the evaluation function is minimal or maximal, and another value corresponding to an observation point deviating from the point where the initial value is set, such that a controller can correct the initial force value in accordance with changes in the evaluation function at the observation point.

11. The optical disk according to claim 10, wherein data from which the evaluation functions are generated is recorded, in the form of pits, in the evaluation-function recording area.

* * * * *